US009868055B1

(12) United States Patent
Rhinesmith et al.

(10) Patent No.: US 9,868,055 B1
(45) Date of Patent: Jan. 16, 2018

(54) GENERATING INDIVIDUAL PLAY BASES IN A VIRTUAL SPACE USING MARKUP INFORMATION

(71) Applicant: KABAM, INC., San Francisco, CA (US)

(72) Inventors: Justin Rhinesmith, Walnut Creek, CA (US); Christopher Vukicevich, San Francisco, CA (US)

(73) Assignee: Aftershock Services, Inc., San Francisco, CA (US)

( * ) Notice: Subject to any disclaimer, the term of this patent is extended or adjusted under 35 U.S.C. 154(b) by 715 days.

(21) Appl. No.: 14/043,790

(22) Filed: Oct. 1, 2013

(51) Int. Cl.
| A63F 13/30 | (2014.01) |
| A63F 13/63 | (2014.01) |
| A63F 13/822 | (2014.01) |
| A63F 13/60 | (2014.01) |
| A63F 13/79 | (2014.01) |

(52) U.S. Cl.
CPC .............. *A63F 13/12* (2013.01); *A63F 13/63* (2014.09); *A63F 13/30* (2014.09); *A63F 13/60* (2014.09); *A63F 13/79* (2014.09); *A63F 13/822* (2014.09)

(58) Field of Classification Search
CPC .......... A63F 13/00; A63F 13/12; A63F 13/30; A63F 13/60; A63F 13/63; A63F 13/79; A63F 13/822
USPC .......................................................... 463/42
See application file for complete search history.

(56) References Cited

U.S. PATENT DOCUMENTS

| 7,500,917 | B2 | 3/2009 | Barney | 463/37 |
| 8,330,284 | B2 | 12/2012 | Weston et al. | 290/1 R |
| 8,384,668 | B2 | 2/2013 | Barney et al. | 345/158 |
| 8,814,698 | B1 * | 8/2014 | Lee | A63F 13/53 463/29 |
| 8,843,585 | B1 * | 9/2014 | Normann | H04N 21/8543 709/217 |
| 2009/0253517 | A1 * | 10/2009 | Bererton | A63F 13/12 463/42 |

(Continued)

OTHER PUBLICATIONS

HotNoob, Global Warfare Game Review [online], May 11, 2011 [accessed Jul. 18, 2016], Retrieved from the internet <URL: https://www.youtube.com/watch?v=CL77swnGiSk>.*

*Primary Examiner* — William H McCulloch, Jr.
*Assistant Examiner* — Chase Leichliter
(74) *Attorney, Agent, or Firm* — Sheppard Mullin Richter & Hampton LLP (57) ABSTRACT

A system and method for generating individual player bases in a virtual space using markup information are disclosed. Player base definitions specific individual players may be managed. The player base definitions may indicate boundaries of player bases in the virtual space, a base type for the player bases, and/or any other information related to the player bases. Player base markup information may be obtained for a given player base type. The obtained player base markup information may indicate, in a markup language format, building information regarding one or more default buildings within a player base having the given base type. Individual player bases may be generated in the virtual space base on the boundaries of the player bases as indicated in the player base definitions associated with the individual players and further based on the player base markup information for the base type of the player bases.

8 Claims, 4 Drawing Sheets

(56) References Cited

U.S. PATENT DOCUMENTS

| | | | |
|---|---|---|---|
| 2010/0093438 A1* | 4/2010 | Baszucki | A63F 13/12 |
| | | | 463/42 |
| 2010/0167648 A1 | 7/2010 | Doutriaux | 455/41.2 |
| 2011/0107239 A1 | 5/2011 | Adoni et al. | 715/757 |
| 2011/0201432 A1 | 8/2011 | Waldock et al. | 463/46 |
| 2012/0015747 A1* | 1/2012 | Ocko | A63F 13/335 |
| | | | 463/42 |
| 2012/0258302 A1 | 10/2012 | Weston et al. | 463/37 |
| 2012/0302353 A1* | 11/2012 | Yang | H04L 67/38 |
| | | | 463/42 |
| 2012/0329556 A1* | 12/2012 | Eddy | A63F 13/10 |
| | | | 463/30 |
| 2013/0109479 A1 | 5/2013 | Ganz | 463/42 |
| 2013/0116046 A1* | 5/2013 | Manton | A63F 13/00 |
| | | | 463/31 |
| 2013/0178256 A1* | 7/2013 | Hess | A63F 13/00 |
| | | | 463/1 |
| 2013/0190087 A1* | 7/2013 | Somarajapuram | A63F 13/00 |
| | | | 463/32 |

\* cited by examiner

GENERATING INDIVIDUAL PLAY BASES IN A VIRTUAL SPACE USING MARKUP INFORMATION

FIELD OF THE DISCLOSURE

This disclosure relates to implementing a virtual space in which an online game takes place, the virtual space implementation including generating individual player bases in the virtual space using player base markup information.

BACKGROUND

Systems that provide players home base in online games hosted by those systems are known. In those systems, a player is typically assigned to a home base located in a virtual space of the online game. Within such a home base, the player may earn income, construct buildings, recruit troops, produce farming yields, harvest resources, craft virtual items, and/or develop virtual skills. Typically, in those systems, the players start with more or less the same home bases having generic layouts when beginning interacting with the online games for the first time. Semantics (such as the generic layout information) for generating such player home bases in the virtual space provided by those systems are typically embedded in codebase of those systems, while player specific information regarding the home bases is managed by player database(s) associated with those systems.

Accordingly, in those systems, changing the configuration of the home base for players typically requires changing of semantics in codebase of those systems. This typically involves modifications of relevant code unit(s) in the existing codebase, recompiling the entire codebase to generate a new codebase and deploying the new codebase to those systems for execution. Such a process not only is cumbersome, but also interrupts the virtual space, which is not desired by the provider of those systems and/or the players.

SUMMARY

One aspect of the disclosure relates to generating individual player bases associated with players in a virtual space of an online game using play base markup information. For facilitating such generation of the individual player bases, player base definitions specific to the players may be managed. A given player base definition specific to a given player may indicate boundaries of a player base associated with the given player in the virtual space, and a base type associated with the player base. The base type may be associated with player base markup information definition, which may indicate, in a markup language format, relevant information associated with player bases having the base type. For example, the player base markup information may include building information regarding one or more default buildings, resource information indicating initially available resources, terrain information indicating terrain types within the player bases having the base type and/or any other information associated with the player bases having the base type. The building information may specify, in the markup language format, default buildings within the player base such as the type, the relative locations (within the player bases), the levels of the default buildings, and/or any other building information regarding the default buildings initially available to the given player when the player base having the base type is first acquired by the given player. The player base markup information for the base type may be stored, for example in a file, database, and/or any other storage separate from codebase of the virtual space.

Based on such player base markup information for a base type and the information indicating boundaries of the player bases in the virtual space associated with individual players, individual player bases may be generated in the virtual space. Since the player markup base information for the base type is in a markup language format, it may be edited through tools capable of parsing the markup language format. A provider, administrator, moderator, and/or any other entity related to the virtual space may easily edit the player base markup information without any programming skills. Unlike in the traditional systems, such edits to the player base markup information may be deployed to a server during the execution of an instance of the virtual space without changing codebase of the virtual space.

Different base types may be provided in the virtual space to distinguish various features of the player bases having different base types. A given base type may dictate the number, type, level, location and/or any other attributes of the default buildings, initially available resources, units and/or any other information specified in the player base markup information associated with the given player base type. In some examples, player markup information for advance base types may specify more default buildings, higher building levels and/or any other advanced attributes associated with default buildings placed in such player bases than the player markup information for the less advanced base types. In some implementations, the player markup information for different base types may be offered to the players for purchase such that the player base having advance base type may cost more consideration (e.g., real-world or virtual currencies) from the players than the less advanced ones. This may enhance monetization opportunities for the provider of the virtual space.

A system configured for may include a server. The server may operate in a client/server architecture with one or more client computing platforms. The client computing platforms may be associated with the players of the virtual space. The server may be configured to execute one or more of a game module, a player module player base configuration module, a player base generation module and/or other modules.

The space module may be configured to execute an instance of the virtual space in which an online game takes place. The players may interact with virtual space elements and/or with each other through gameplays provided by the online game. The game plays may include role-playing, first-person shooter, real-time strategy, turn-based strategy, simulation, music and/or rhythm playing, social interaction, twitching and/or any other gameplays. The players may participate in the instance of the virtual space by inputting commands to initiate player actions for controlling one or more of virtual space elements. Upon receiving the player commands initiating the player actions, the space module may be configured to execute the player actions. Within the instance of the virtual space, the players may construct, upgrade, and/or demolish virtual buildings. Virtual buildings may be virtual space elements providing specific functionality to the players to enable the players to engage in various activities. For a specific type of buildings, different levels may be established to distinguish various features of the type of buildings.

Within the instance of the game space executed by the game module, players may be associated with player bases in the virtual space. When a new player starts interacting with the virtual space for the very first time upon joining the online game, the new player may be assigned to a new player base that has not been occupied by any other players previously in the virtual space. Typically the new and unoccupied player base may have several default game elements, for example such as buildings, resources, units (population, troops, famers, and so on), and/or any other default game elements that may be placed in the new and unoccupied player base. These default game elements typically provide necessary functionality, material, resource, or any other virtual space means for the new player to start interacting with the virtual space. A given player base typically has boundaries that define an area in the virtual space. The boundaries of the player base may be specified in terms of coordinates within the virtual space, in terms of tile number within the virtual space, and so on. Within the area inside boundaries of the given player base, different terrain types and/or resources may be present.

The player module may be configured to access and/or manage one or more player profiles and/or player information associated with players. The player information may include a player base definition defining various aspects of one or more player bases associated with a player in the virtual space. The player base definition may indicate, for example boundaries of the player bases in the virtual space through location expression(s) such as coordinate sets, shape definition, tile group specification and/or any other location expression. The player base definition may indicate a base type for the player base. A given base type, for example may dictate features of a player base having the given base type, such as the number, type, level and/or any other aspects of default buildings, resources, units, terrains and/or or any other default game space elements initially available in the player base when first acquired by a player. Different base types, e.g., indicating different levels of player bases may be predetermined by the provider of the virtual space to distinguish player bases having the different base types.

The player base configuration module may be configured to obtain player base markup information for the base types. The player base markup information obtained by the player base configuration module 116 may include information, specified in a markup language format indicating various aspects for a new and unoccupied player base having a given base type. Such aspects may include a level, a name of the new and unoccupied player base, building information indicating one or more default buildings within the new and unoccupied player base, resource information regarding the new and unoccupied player base, terrain information regarding the new and unoccupied player base, and or any other aspects of new and unoccupied player base having the given base type. Such aspects may be specified in a markup language format, for example in a hierarchical structure. The markup language format may include extensible markup language (XML), Yet Another Markup Language (YAML), hyper extensible markup language (HTML), and/or any other markup language format.

The player base configuration module may obtain the player base markup information for a given base type, for example from electronic storage. In some exemplary implementations, such player base markup information may be stored in files on the electronic storage. At any point during the runtime of virtual space, the player base configuration module may obtain the player base markup information for a given base type by retrieving such files from the electronic storage. The player base configuration module may perform such retrieval at instructions of other modules (e.g., player base generation module), at a restart of the server providing the virtual space, at instructions of provider, administrator, moderator, and/or any other entities related to the virtual space via a graphical interface, and/or at any other point during the runtime of the virtual space.

The player base generation module may be configured to generate individual player bases in the virtual space based on the player base boundaries indicated in the player base definitions included in the player information managed by the player module, and further based on the player base markup information for the base types of the individual player bases as also indicated in such player base definitions. In some examples, the individual player bases may be generated by the player base generation module in a player database included in or coupled to the system for further processing by other modules, for example the space module. Simultaneously or alternatively, the individual player bases may be generated by the player base configuration module as output to the client computing platform for presentation to the players. In some exemplary implementations, the player base generation module may be configured such that the player markup information for base type obtained by the player base configuration module may cause the player base generation module to generate an instance of a player base having the base type according to the player markup information. This may involve generating, in accordance with the player base markup information, graphical information for presentation on the client computing platform so that the instance of building type may be displayed on the client computing platform, generating, in accordance with the player base markup information, a database record to the same effect, and/or any other operations.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
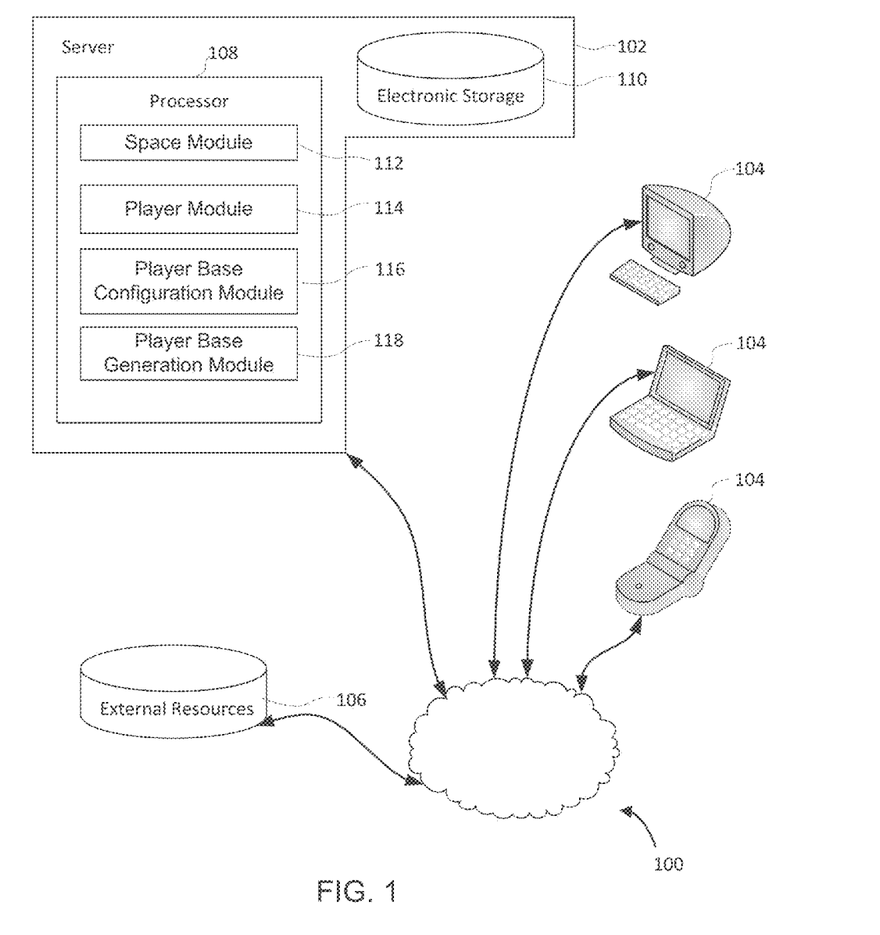
FIG. 1 illustrates one example of a system for generating individual player bases in a virtual space using markup information in accordance with the disclosure.

FIG. 1 illustrates a system 100 for generating player bases in a virtual space using markup information. Providing the virtual space/environment may include hosting the virtual space/environment over a network. Providing the virtual space may include hosting the virtual space over a network. The players may access system 100 and/or the virtual space via client computing platforms 104.

In some implementations, system 100 may include a server 102. The server 102 may be configured to communicate with one or more client computing platforms 104 according to a client/server architecture. The players may access system 100 and/or the virtual space via client computing platforms 104. The computer program modules may include one or more of a space module 112, player module 114, player base configuration module 116, player base generation module 118 and/or other modules.

The game module 112 may be configured to execute an instance of the game space in which an online game takes place. Within the instance of the game space, the players may participate in the game space to experience gameplays provided by the online game. The gameplays may include role-playing, first-person shooter, real-time strategy, turn-based strategy, simulation, music or rhythm playing, social interaction, twitching and/or any other gameplays. For facilitating the player participation in the game space, the game module 112 may be configured to determine states of the game space communicated (e.g., via streaming visual data, via object/position data, and/or other state information) from server 102 to client computing platforms 104 for presentation to players. A given game space state determined and transmitted to a given client computing platform 104 may correspond to a view for a player character being controlled by a player via the given client computing platform 104 at a point of time in the game space. The given state determined and transmitted to a given client computing platform 104 may correspond to a location in the game space. The view described by the given state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the player.

The instance of the game space may comprise a simulated space that is accessible by players via clients (e.g., client computing platforms 104) that present the views of the game space to a player. The simulated space may have a topography, express ongoing real-time interaction by one or more players, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The instance of the game space may comprise automatically controlled entities not associated with any player. As such, the automatically controlled game space entities may be generated, controlled, evolved, customized, developed and/or otherwise provided by artificial intelligence configured into the server 102 by a provider, administrator, moderator, and/or any other entities related to the game space. The automatically controlled game space entities interact with entities controlled by or associated with the players, other automatically controlled game space entities and as well as the topography of the game space. Certain traits, attributes and/or characteristics may be manifested by, possessed by and/or otherwise associated with the automatically controlled entities and evolved in the game space in accordance with the artificial intelligence. As an illustration, such evolving characteristics of the automatically controlled game space entities may include skills, abilities, powers, strength, stamina, physical appearances such as age, attire, facial expression, speech style and pattern, response style in reaction to player's interaction, gesture and/or any other traits. Examples of the automatically controlled game space entities may include game space characters, objects, components of the topography, game space phenomena (e.g., rains, storms, snow), and/or any other automatically controlled game space elements. As used herein, such automatically controlled game space entities in the instance of the game space are referred to as "AI entities".

The above description of the manner in which state of the game space is determined by game module 112 is not intended to be limiting. The game module 112 may be configured to express the game space in a more limited, or richer, manner. For example, views determined for the game space representing the state of the instance of the game space may be selected from a limited set of graphics depicting an event in a given place within the game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game space are contemplated.

Within the instance of the game space executed by game module 112, the players may participate in the instance of the game space by controlling one or more of an element in the game space. The player controlled elements may include player controlled entities such as avatars, characters, units (e.g., troops) and/or any other player controlled entities, controlled objects such as weaponry, vehicle, artillery, medicine, decorative items and/or any other player controlled game space objects, simulated physical phenomena such as wind, rain, earthquakes, and/or other phenomena, and/or other player controlled elements. The player controlled avatars may represent the players in the game space. The player controlled characters (herein referred to as "player characters") may include heroes, knights, commanders, leaders, generals and/or any other individualized characters that may be trained, recruited, captured, and/or otherwise acquired by the players. The game space units controlled by the player may include troops, cohorts, and/or any other game space entities that may be trained, recruited, captured, and/or otherwise acquired by the players in groups or en mass. Unlike player characters, individual members of a game space unit controlled by a given player may not be individualized (e.g., they may share attributes associated with the unit of the troop).

In any case, the player controlled elements may move through and interact with the game space (e.g., AI entities, elements controlled by other players and/or topography in the game space). The elements controlled by a given player may be created and/or customized by the given player. The given player may have an "inventory" of virtual goods and/or currency that the given player can use (e.g., by manipulation of a player character or other player controlled elements, and/or other items) within the game space.

Controls of virtual elements may be exercised through commands input by the players through client computing platforms 104. The players may interact with each other through communications exchanged within the game space. Such communications may include one or more of textual chat, instant messages, private messages, voice communications, and/or other communications. Communications may be received and entered by the players via their respective client computing platforms 104. Communications may be routed to and from the appropriate players through server 102 (e.g., through game module 112).

A given player may input commands with specific parameters through a client computing platform 104 associated with the given player to initiate player actions or sphere of actions, to under specific deeds, to perform functions and/or initiate any other types of interactions within the game space or with other players. For example, the given player may input commands to construct, upgrade and/or demolish virtual buildings, harvest and/or gather virtual resources, heal virtual player controlled elements, AI entities and/or elements controlled by other players, train, march, transport, reinforce, reassign, recruit, and/or arrange troops, attack, manage, create, demolish and/or defend cities, realms, kingdoms, and/or any other game space locations controlled by or associated with the players, craft or transport virtual items, interact with, compete against or along with AI entities and/or game space elements controlled by other players in combats, research technologies and/or skills, mine and/or prospect for virtual resources, complete missions, quests, and/or campaigns, exercise magic power and/or cast spells, and/or perform any other specific deeds, actions, functions, or sphere of actions within the game space. In some examples, the given player may input commands to compete against elements in an environment within the game space—i.e., PvE activities. In some examples, the given player may input commands to compete against each other within the game space—i.e., PvP activities.

The game module 112 may be configured to execute player actions to facilitate interaction of the players with the game space and/or each other in response to receiving game space commands input by the players. Execution of the player actions by the game module 112 may produce changes to the game space state, which may reflect progresses and/or results of the player actions. In some examples, state changes caused by the execution of the player actions may be recorded in the electronic storage 110 to facilitate persistency throughout the instance of the game space. In some examples, execution of the player actions may not produce persistent changes to the game space state (e.g., a player character jumping forward and backward successively may not produce any perceivable game state changes to other players).

Within the instance of the virtual space, players may construct, upgrade, and/or demolish virtual buildings. Virtual buildings may be virtual space elements providing specific functionality to the players to enable the players to engage in various activities. For example, a player may construct a barrack to train troops, a barn to store food supply, a defense tower to defend the player base, a factory to produce consumable virtual items, a workshop to craft virtual objects, and so on. For a specific type of buildings, different levels may be established to distinguish various features of the type of buildings. For example, a lower level of barrack may train less troops than a higher level of barrack; a lower level barn may store less food than a higher level barn; a lower level defense tower may have smaller defense ranger than a higher level defense tower; a lower level factory may produce less products per unit time than a higher level factory; and so on. Players may upgrade a building to the next level by, for example spending resources, virtual currencies, and/or any other virtual consideration as desired by the provider of the virtual space.

Within the instance of the game space executed by the game module 112, players may be associated with player bases in the virtual space. When a new player starts interacting with the virtual space for the very first time upon joining the online game, the new player may be assigned to a new player base in the virtual space, where the player may construct buildings, raise population, farming, manufacturing, mining and so on, train troops, develop virtual skills, magic, strength, power, and so on, conduct diplomacy, make alliance, and/or perform many more other activities within the player base. Such a new player base may be unoccupied in a pristine state such that no other players have developed or engaged in with such player base previously. That is, acquiring a new and unoccupied player base may be a different gameplay provided in the virtual space distinguished from conquering player bases already developed by other players.

Typically the new and unoccupied player base may have several default game elements, for example such as, buildings, resources, units (population, troops, famers, and so on), and/or any other default game elements that may be placed in the new and unoccupied player base. These default game elements typically provide necessary functionality, material, resource, or any other virtual space means for the new player to start interacting with the virtual space. For example, the new and unoccupied player base may have a default barrack for player to train troops, a few farms for player to grow food supplies to raise population level, a factory for player to earn some income and so on. With such default game space elements in the new and unoccupied player base, the new player may start to interact with the virtual space, for example by raising population, recruiting specialists from the population (e.g., troops, workers, farmers, miner, resource collectors, and so on), harvesting resources, constructing new buildings, upgrade existing buildings, and/or any other activities.

As a player progresses in the virtual space, the player may acquire more new and unoccupied player base(s). For example, during the course of interacting with the virtual space, the player may be assigned to a new and unoccupied player by the provider, administrator, moderator, and/or any other entities related to the virtual space; or the player may expand on the player's own to develop more new player base(s). That is, during the course of player interactions with the virtual space, the player may acquire new and unoccupied player base(s) in accordance with the in-game conditions set forth by the provider of the virtual space for player to acquire new player base. For example, the provider may set forth that at every major experience level, a player may set up a new player base within 40 tiles of the current player base(s).

Some examples of player bases may include cities, castles, spaceships, farm land, enclaves, realms, kingdoms, and/or any other types of player bases. A given player base typically has boundaries that defines an area the given place occupies in the virtual space. Within the boundaries of the player base, the player is provided with more in-game means to interact with the virtual space than outside the boundaries of the player base. The boundaries of the player base may be specified in terms of coordinates within the virtual space, in terms of tile number within the virtual space, and so on. For example, a player base may have boundaries the defines a polygon shape of area with the virtual space having coordinates (x1,y1; x2,y2; x3,y3; x4,y4). Within such an area, different terrain types and/or resources may be present. For example, some player bases may have aquatic resources as these player bases are within a costal region in the virtual space; while some other player bases may have mine resources as these player bases are within a mountain range in the virtual space.

The player module 114 may be configured to access and/or manage one or more player profiles and/or player information associated with players of the system 100. The one or more player profiles and/or player information may include information stored by server 102, one or more of the client computing platforms 104, and/or other storage locations. The player information may indicate inventories available to the individual players in the virtual space. An inventory associated with a given player may list virtual items, virtual resources, virtual space elements associated with the given player or under control of the player and/or any other virtual space components of the given player at a time of inventory inquiry.

The player information may include a player base definition defining various aspects of one or more player bases associated with a player in the virtual space. The player base definition may indicate, for example boundaries of the player base in the virtual space through location expression(s) such as coordinate sets, shape definition, tile group specification and/or any other location expression. For example, for a given player, the player information of the given information managed by the player module 114 may include a player base definition indicating that the given player is associated with a player base in the virtual space and the boundaries of the player base are (x1,y1; x2,y2; x3; y3; x4,y4).

The player base definition may indicate a base type associated with the player base. A given base type, for example may dictate features of an player base having the give base type, such as the number, type, level and/or any other aspects of default buildings, resources, units, terrains and/or or any other default game space elements initially available in the player base when first acquired by a player. Different base types e.g., indicating different levels of player bases may be predetermined by the provider of the virtual space to distinguish player bases having the different base types. For example, a new and unoccupied player base having a less advanced base type may have less number of default buildings than a new and unoccupied player base having a more advanced level of base type. Further details about base types associated with player bases will be illustrated in FIGS. 2A-2B.

The player base configuration module 116 may be configured to obtain player base markup information for the base types. The player base markup information obtained by the player base configuration module 116 may include information, specified in a markup language format, indicating various aspects for a new and unoccupied player base having a given base type. Such aspects may include a level, a name of the new and unoccupied player base, building information indicating one or more default buildings within the new and unoccupied player base, resource information regarding the new and unoccupied player base, terrain information regarding the new and unoccupied player base, and or any other aspects of new and unoccupied player base having the given base type. Such aspects may be specified in the markup language format, for example in a hierarchical structure. The markup language format may include extensible markup language (XML), Yet Another Markup Language (YAML), hyper extensible markup language (HTML), and/or any other markup language.

The player base configuration module 116 may obtain the player base markup information for a given base type from, for example electronic storage 110. In some exemplary implementations, such player base markup information may be predetermined by the provider, administrator, moderator, and/or any other entities related to the virtual space and stored in files on the electronic storage 110. At any point during the runtime of system 122, the player base configuration module 116 may obtain the player base markup information for the given base type by retrieving such files from the electronic storage. The player base configuration module 116 may perform such retrieval at instructions of other modules of the system 100 (e.g., player base generation module 118), at a restart of the server 102, at instructions of provider, administrator, moderator, and/or any other entities related to the virtual space via a graphical interface, and/or at any other point during the runtime of system 102. In some other implementation, the player markup information may be obtained by the player base configuration module 116 from a player database associated with the system 100, the external resources 106, a network location, a third party content provider, and/or any other sources.

Figures 2A, 2B:
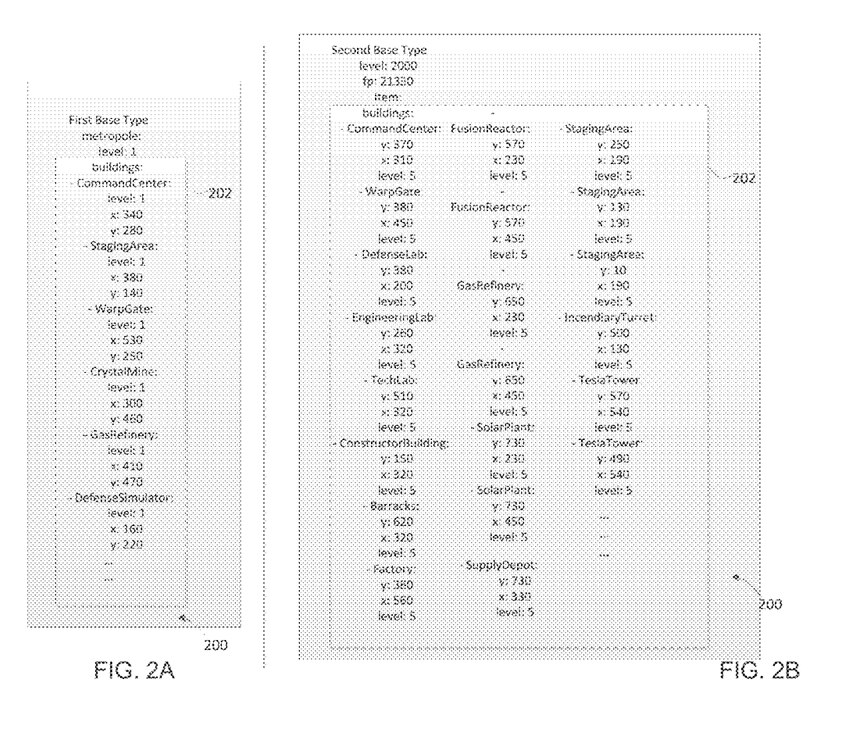
FIG. 2A illustrates one example of player markup information for a first base type in the virtual space provided by the system shown in FIG. 1.
FIG. 2B shows an example of player markup information for a second base type in the virtual space provided by the system shown in FIG. 1.

FIG. 2A illustrates one example of player markup information for a first base type in the virtual space provided by the system shown in FIG. 1. As shown in this example, the player markup information 200 obtained by the player base configuration module 116 is in a YAML format. It should be appreciated this is only illustrative. In some other examples, the player markup information 200 for the first base type obtained by the player base configuration module 116 may be in other markup language formats, such as XML, HTML, and/or any other markup language format. As shown in this example, the player markup information 200 may include building information 202 regarding one or more default buildings available to player initially when the players acquire new and unoccupied player bases having the first base type. It should be understood, although in this illustrative example building information 202 is only shown, other information such as resource, production, terrain, units regarding the player base having the first base type may be specified in the player markup information 200 similarly to the building information 202. In any case, as shown, the building information 202 illustrated in FIG. 2A for first base type may include types of default buildings that may be instantiated in a player base having the first base type, e.g. the "Command Center, Staging Area, Warp Gate, Crystal Mine, Gas Refinery, Defense Simulator". As also shown, for each default building indicated in the building information 202, attributes such as building level and relative location of the default buildings within a player base having first base type may be specified in the markup language format (e.g., YAML in this example). For instance, as illustrated in FIG. 2A, a player base having the first base type may have a level 1 command center placed at a relative location (340,280) within the player base. It should be appreciated that the location information associated with each default building in this example is relative location within a player base having the first base type.

FIG. 2B shows an example of player markup information for a second base type in the virtual space provided by the system shown in FIG. 1. As shown in this example, the building information 202 specifies, in the markup language format (e.g., YAML), more default buildings than those specified in the building information included in the player markup information 200 for the first player base type shown in FIG. 1. It should be also noticed that for the buildings included in the first base and second base types, e.g., command center, staging area, warp gate, crystal mine, gas refinery, defense simulator, the levels of these default buildings specified in the player markup information 200 for the second base type is higher than those in the player markup information 200 for the first base type shown in FIG. 2A. It should be further noticed that the locations of those common buildings within the player base are different between first base type and second base type.

Referring back to FIG. 1, the player base generation module 118 may be configured to generate individual player bases in the virtual space based on the player base boundaries indicated in the player base definitions included in the player information managed by the player module 114, and further based on the player base markup information for the base types of the individual player bases as also indicated in the player base definitions. In some exemplary implementations, for generating a given player base associated with a player in the virtual space, the player base generation module 118 may first obtain the player base definition for the player (e.g., via the player module 114); extract the information indicating the boundaries of the given player base in the virtual space and a base type of the given player base from the obtained player base definition; obtain the player base markup information for the extracted base type of the given player base (e.g., via the player base configuration module 116); parse the obtained player base markup information for the base type; obtain default building information such as the type, location, level and/or any information associated with the default buildings specified in the player base markup information; generate the default buildings at the extracted default building locations in reference with the obtained boundaries of the player base; and generate other elements of the player base in similar fashion.

In some examples, the individual player bases may be generated by the player base generation module 118 in a player database included in or coupled to the system 100 for further processing by other modules of the system 100, for example the space module 112. Simultaneously or alternatively, the individual player bases may be generated by the player base configuration module 116 as output to the client computing platform 104 for presentation to the players.

In some exemplary implementations, the player base generation module 118 may be configured such that the player markup information for base type obtained by the player base configuration module 116 may cause the player base generation module 118 to generate an instance of a player base having the base type according to the player markup information. For example, the obtained player markup information may indicate an instance of a building type B should be placed at a location of (X,Y) within the player base as a default building. Upon such information being parsed and obtained by the player base generation module 118, the player base generation module 118 may generate the instance of the building type B as a X,Y within the boundaries of the player base in the virtual space. This may involve generating graphical information for presentation on the client computing platform 104 so that the instance of building type B may be displayed at a location X,Y relative to the boundaries of the player base in the virtual space, or generating database record to the same effect.

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program modules. The computer program modules may be configured to enable an expert or player associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute modules 112, 114, 116, 118. Processor 108 may be configured to execute modules {module numbers} by software; hardware; firmware; some combination of software, hardware, and/or firmware; and/or other mechanisms for configuring processing capabilities on processor 108.

It should be appreciated that although modules {module numbers} are illustrated in FIG. 1 as being co-located within a single processing unit, in implementations in which processor 108 includes multiple processing units, one or more of modules {module numbers} may be located remotely from the other modules. The description of the functionality provided by the different modules {module numbers} described below is for illustrative purposes, and is not intended to be limiting, as any of modules {module numbers} may provide more or less functionality than is described. For example, one or more of modules {module numbers} may be eliminated, and some or all of its functionality may be provided by other ones of modules {module numbers}. As another example, processor 108 may be configured to execute one or more additional modules that may perform some or all of the functionality attributed below to one of modules {module numbers}.

Figure 3:
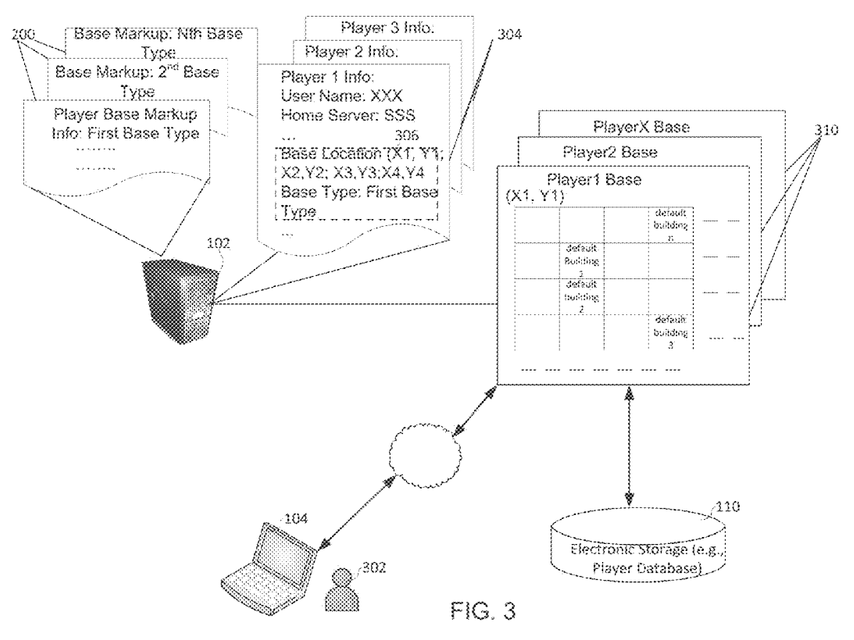
FIG. 3 illustrates one example for generating individual player bases in the virtual space provided by system shown in FIG. 1.

FIG. 3 illustrates one example for generating individual player bases in the virtual space provided by system 100 shown in FIG. 1 using the player base markup information shown in FIGS. 2A-B. It will be described with references to FIGS. 1 and 2A-B. As shown in this example, the server 102 manages player information 304 associated with players, for example player 302 via a player module as described above. As shown, the player information 304 may include player base definition 306 indicating boundaries of the player bases associated with the individual players in the virtual space and base types of the player bases. As illustrated, the player base definition 306 associated with player 1 indicates that the player base associated with player 1 has boundaries defined by (x1, y1; x2, y2; x3, y3; x4,y4) and a first base type. As shown, player markup information for the first base type, such as the player markup information 200 shown in FIG. 2 may be obtained by the server 102. As described above, the player markup information 200 may indicate, in a markup language format, various default aspects associated with a player base having the first base type, such as the building information 202 regarding one or more default building initially placed in the player base having first base type.

As shown, based on the player base definition 306 and the player base markup information 200 for the base type indicated in the player definition 306, the server 102 may generate individual player bases 308 in the virtual space. The generated individual player base has the default building placed in the virtual space in accordance with the player base markup information for the base type of the individual player bases 308. As illustrated, the generated individual player bases may be output to the client computing platform 104 for presentation. Simultaneously or alternatively, the generated individual player bases may be embodied in a database record stored on a player database implemented on the electronic storage 110.

Figure 4:
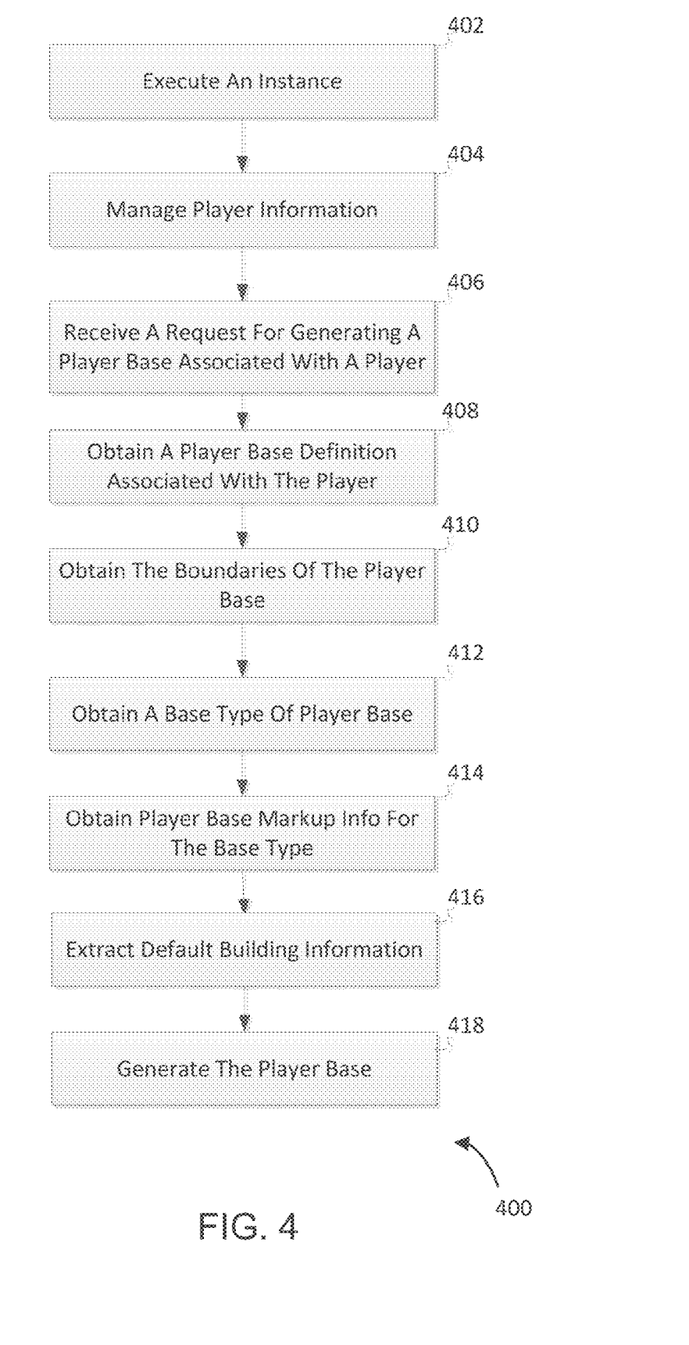
FIG. 4 illustrates one exemplary method for generating individual player bases in a virtual space using player markup information in accordance with the disclosure.

FIG. 4 illustrates one exemplary method 400 for generating individual player bases in a virtual space using player markup information in accordance with the disclosure. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, an instance of a virtual space may be executed and implemented to determine view information for transmission to one or more client computing platforms associated with players. The players may interact with the virtual space by initiating virtual space commands to perform player actions. The player actions may be executed in the virtual space. In some implementations, operation 402 may be performed by a space module the same as or similar to space module 112 (shown in FIG. 1 and described herein).

At an operation 404, player information associated with the players may be managed. The player information may include player base definitions. The player base definition may indicate, for example boundaries of the player base in the virtual space through location expression(s) such as coordinate sets, shape definition, tile group specification and/or any other location expression. In some implementations, operation 406 may be performed by a player module the same as or similar to player module 114 (shown in FIG. 1 and described herein).

At an operation 406, a request for generating a player base associated with a player may be received. In some implementations, operation 408 may be performed by a player base generation module the same as or similar to player base generation module 118 (shown in FIG. 1 and described herein).

At an operation 408, a player base definition for the player base being requested in operation 406 may be obtained. In some implementations, operation 408 may be performed by a player base generation module the same as or similar to player base generation module 118 (shown in FIG. 1 and described herein).

At an operation 410, the boundaries of the player base being requested in operation 408 may be obtained from the player base definition obtained in operation 410. The player boundaries obtained in operation 410 may indicate an area in the virtual space that may be assigned to the player as the player base for the player. In some examples, the player boundaries obtained in operation 410 may include coordinate sets defining the boundaries. In some implementations, operation 410 may be performed by a player base generation module the same as or similar to player base generation module 118 (shown in FIG. 1 and described herein).

At an operation 412, a base type for the player base may be obtained from the player definition obtained in operation 408. The base type obtained in operation 412, for example may dictate features of the player base having the base type, such as the number, type, level and/or any other aspects of default buildings, resources, units, terrains and/or or any other default game space elements initially available in the player base when first acquired by a player. In some implementations, operation 412 may be performed by a player base generation module the same as or similar to player base generation module 118 (shown in FIG. 1 and described herein).

At an operation 414, the player base markup information for the base type obtained in operation 412 may be obtained. The player base markup information obtained in operation 414 may include information, specified in a markup language format, indicating various aspects for a new and unoccupied player base having a given base type. Such aspects may include a level, a name of the new and unoccupied player base, building information indicating one or more default buildings within the new and unoccupied player base, resource information regarding the new and unoccupied player base, terrain information regarding the new and unoccupied player base, and or any other aspects of new and unoccupied player base having the given base type. Such aspects may be specified in the markup language format, for example in a hierarchical structure. The markup language format may include extensible markup language (XML), Yet Another Markup Language (YAML), hyper extensible markup language (HTML), and/or any other markup language. In some implementations, operation 414 may be performed by a player base configuration module the same as or similar to player base configuration module 116 (shown in FIG. 1 and described herein).

At an operation 416, building information regarding one or more default buildings may be extracted from the player markup information obtained in operation 414. The building information regarding the one or more default building specified, in the markup language format, may be extracted in operation 416 by employing markup language parser. The extracted default building information may include locations, levels and/or any other attributes related to the one or more buildings within the player base having the base type obtained in operation 412. In some implementations, operation 416 may be performed by a player base configuration module the same as or similar to player base configuration module 116 (shown in FIG. 1 and described herein).

At an operation 418, the player base requested in operation 418 may be generated based on the boundaries of the player base obtained in operation 410, and further based on the player base markup information obtained in operation 414 and the building information regarding the one or more default buildings extracted in operation 416. In some implementations, operation 418 may be performed by a player base generation module the same as or similar to player base generation module 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A virtual space server generating individual player bases in a virtual space using markup information, the virtual space server comprising:
one or more physical processors configured by machine-readable instructions to:
execute an instance of the virtual space in which an online game takes place, and to implement the instance of the virtual space to facilitate player participation in the online game via client computing platforms by transmitting space state information derived from the instance of the virtual space to the client computing platforms, wherein player participation includes performing activities within player bases within the virtual space, the activities including one or more of earning income, constructing buildings, recruiting and/or training troops, producing farming yields, harvesting resources, crafting virtual items and/or developing virtual skills;
manage player accounts comprising player information associated with individual players, the player accounts including a first player account associated with a first player;
obtain player base markup files for the player bases, the obtained player base markup files being in a markup language format and defining individual bases associated with the players separate from other player information associated with individual players in the player account, the obtained player base markup files including a first player base markup file that defines a first base associated with the first player, the first player base markup file being separate from the other player information included in the first player account;
generate, on the virtual space server, player bases in the instance of the virtual space based on the player base markup files such that the first player base is generated in the instance of the virtual space based on a first boundary and the first player base markup information; and
generate, format, and initiate transmission of state information derived from the instance of the virtual space to the client computing platforms to facilitate user participation in the virtual space.

2. The virtual space server of claim 1, wherein the one or more processors are further configured by machine-readably instructions such that the first player base markup file for the first base specifies, in the markup language format, building information regarding one or more default virtual buildings within the first player base, the building information indicating locations of the virtual buildings within the first player base.

3. The virtual space server of claim 2, wherein the building information specified by the first player base markup file for the first base further indicates levels of default buildings in the first player base.

4. The virtual space server of claim 1, wherein the markup language format includes Extensible Markup Language (XML) and/or Yet Another Markup Language (YAML).

5. A method for generating individual player bases in a virtual space using markup information, the method being implemented in physical processors of a virtual space server, the physical processors being configured by machine-readable instructions, the method comprising:
executing an instance of the virtual space in which an online game takes place, and implementing the instance of the virtual space to facilitate player participation in the online game via client computing platforms by transmitting space state information derived from the instance of the virtual space to the client computing platforms, wherein player participation includes performing activities within player bases within the virtual space, the activities including one or more of earning income, constructing buildings, recruiting and/or training troops, producing farming yields, harvesting resources, crafting virtual items and/or developing virtual skills;

managing player accounts comprising player information associated with individual players, the player accounts including a first player account associated with a first player;

obtaining player base markup files for the player bases, the obtained player base markup files being in a markup language format and defining individual bases associated with the players separate from other player information associated with individual players in the player account, the obtained player base markup files including a first player base markup file that defines a first base associated with the first player, the first player base markup file being separate from the other player information included in the first player account;

generating player bases in the instance of the virtual space based on the player base markup files such that the first player base is generated in the instance of the virtual space based on the first player base markup file;

deriving state information from the instance of the virtual space for transmission to the client computing platforms to facilitate user participation in the virtual space;

formatting the state information for transmission to the client computing platforms to facilitate user participation in the virtual space; and initiating transmission of the state information to the client computing platforms to facilitate user participation in the virtual space.

6. The method of claim 5, wherein the first player base markup file for the first base specifies, in the markup language format, building information regarding one or more default virtual buildings within the first player base, the building information indicating locations of the virtual buildings within the first player base.

7. The method of claim 6, wherein the building information included in the first player base markup file for the first base further indicates levels of default buildings in the first player base.

8. The method of claim 5, wherein the markup language format includes Extensible Markup Language (XML) and/or Yet Another Markup Language (YAML).

* * * * *